United States Patent
Meydieu et al.

(10) Patent No.: US 7,367,371 B2
(45) Date of Patent: May 6, 2008

(54) INFLATION CIRCUIT, IN PARTICULAR FOR A TIRE MOUNTED ON A WHEEL, AND CORRESPONDING WHEEL

(75) Inventors: Michel Meydieu, Clermont-Ferrand (FR); Claudio Battochio, Riom (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 470 days.

(21) Appl. No.: 10/671,566

(22) Filed: Sep. 29, 2003

(65) Prior Publication Data

US 2004/0055291 A1    Mar. 25, 2004

Related U.S. Application Data

(63) Continuation of application No. PCT/FR02/01205, filed on Apr. 5, 2002.

(30) Foreign Application Priority Data

Apr. 9, 2001    (FR)    ................... 01 04830

(51) Int. Cl.
    *B60C 23/10*    (2006.01)
(52) U.S. Cl. ............................................. 152/416
(58) Field of Classification Search ........ 152/415–416; 60/468; 303/87
    See application file for complete search history.

(56) References Cited

U.S. PATENT DOCUMENTS

| | | | | |
|---|---|---|---|---|
| 2,401,883 A | * | 6/1946 | Cyril et al. ................. | 123/338 |
| 2,406,899 A | * | 9/1946 | Cyril et al. ............ | 137/115.18 |
| 3,706,325 A | * | 12/1972 | Pauliukonis ........... | 137/625.66 |
| 3,838,717 A | * | 10/1974 | Wolf ............................ | 141/65 |
| 3,912,033 A | * | 10/1975 | Ancel ......................... | 180/307 |
| 4,782,879 A | * | 11/1988 | Le Chatelier et al. ...... | 152/417 |
| 4,922,946 A | * | 5/1990 | Boulicault .................. | 137/102 |
| 5,234,027 A | * | 8/1993 | Naples ..................... | 137/513.3 |
| 5,587,698 A | * | 12/1996 | Genna ........................ | 340/442 |
| 5,674,332 A | * | 10/1997 | Battocchio .................. | 152/416 |
| 6,758,088 B2 | * | 7/2004 | Claussen et al. .............. | 73/146 |
| 6,892,776 B2 | * | 5/2005 | Skoff ....................... | 152/342.1 |
| 2003/0084663 A1 | * | 5/2003 | Heyne et al. ................. | 60/468 |
| 2004/0020534 A1 | * | 2/2004 | Beau ......................... | 137/223 |

FOREIGN PATENT DOCUMENTS

| | | | |
|---|---|---|---|
| FR | 2 699 122 A | | 6/1994 |
| GB | 659582 A | | 10/1951 |
| GB | 1397372 | * | 6/1975 |
| WO | WO 9413499 A1 | * | 6/1994 |

OTHER PUBLICATIONS

International Search Report dated Aug. 6, 2002.

* cited by examiner

*Primary Examiner*—Jason R. Bellinger
(74) *Attorney, Agent, or Firm*—Buchanan Ingersoll & Rooney PC (57) ABSTRACT

An automatic inflation and deflation circuit for a tube (3) is produced with a single compressed fluid supply conduit (5). The inflation results from subjecting a non-return valve (VA) in series on the conduit to excess pressure. Deflation is provided by subjecting the non-return valve for a brief moment to excess pressure and then in producing (EVDG) a calibrated leak (11) in the conduit. Evidence is provided that the pressure in the conduit is such that it enables to maintain the non-return valve open, although the pressure on the side of the tube is higher than the pressure in the conduit during deflation.

14 Claims, 4 Drawing Sheets

INFLATION CIRCUIT, IN PARTICULAR FOR A TIRE MOUNTED ON A WHEEL, AND CORRESPONDING WHEEL

This application is a continuation of Application No. PCT/FR02/01205, filed on Apr. 5, 2002, which is incorporated by reference.

The present invention relates to an inflation circuit, in particular inflation circuit usable in a vehicle. It also relates to a wheel equipped with such a circuit. This inflation circuit can be used in particular for inflating tires, even when the vehicle is moving. The object of the invention is to reduce the cost of these inflation circuits whilst retaining all their properties.

Inflation circuits are known which allow the pressure in the chamber of a tire to be adjusted, even when the tire is mounted on a wheel which is turning on a moving vehicle. These inflation circuits comprise an assembly of lines and valves making it possible to inject a fluid, normally air, into the tire to inflate the same or on the contrary to allow deflation of the tire. These inflation circuits are complex and generally require double ducts as well as complicated double valves in order to carry out the two functions. An example of such an inflation and deflation circuit is given in the patent specification FR-A-884 598.

In principle, a valve is a simple device. When it is has high pressure on one side, it permits the passage of a fluid in a favored direction. On the other hand, when the high pressure is on the other side, on the side of an enclosure closed by the valve, the valve normally acts as a sealing-tight stopper and prevents leaks. It is therefore known that, without external intervention, it is not possible to deflate a tire. In order to achieve this result, it is therefore necessary to provide complex valves, which are expensive per se and require in practice the doubling of ducts for supplying and discharging fluid. The problem becomes more complicated by the fact that since a wheel is an element which turns relative to a fixed chassis, the mobility of these parts is necessarily associated with particularly precise manufacturing constraints in order to preserve long-term sealing-tightness and to maintain the pressure in the tires.

The object of the invention is to overcome this problem by proposing a particularly simple solution, wherein in practice a single duct leads from a source of compressed fluid, in practice compressed air, to the chamber and to the tire, this duct being equipped furthermore with a particularly simple mechanism allowing the tire(s) to be inflated or deflated at will whilst using a simple valve.

One principle of the invention consists in providing a calibrated leak in the inflation circuit. The leak is arranged from a branch mounted on the main duct. This calibrated leak is furthermore preferably put into operation or neutralized by a slide valve. It can be demonstrated therefore that during inflation it suffices to close the slide valve and to inflate the chamber, in a conventional manner, until the desired pressure is achieved. For deflation, inflation of a limited duration is effected, e.g. for 1 second, then, at the same time as closure of a slide valve located directly downstream of the compressed fluid source, the slide valve of the calibrated leak is opened. In these circumstances there remains in the inflation circuit a pressure sufficient to keep the inflation valve open, although the pressure in the tire is higher than the pressure in the circuit. In these circumstances the tire deflates.

The air is evacuated through the calibrated leak in such a manner that the pressure in the tire and the pressure in the inflation/deflation circuit decreases simultaneously and progressively. In practice, deflation can last quite long, 60 to 200 seconds. Such slow deflation has two advantages. On the one hand it exists, which makes it possible, when a vehicle is moving, to reduce the pressure in the tires which would be overinflated (in particular due to a cold start at pressure which is too high). It is also possible to adapt the pressure of the tires to different driving conditions: town, main road, motorway, full load, empty, on sand, and so on. On the other hand, this slow deflation makes it possible to adjust the tire pressure very easily at the moment of deflation in order to end up with the desired pressure. It will be shown furthermore that the solution of the invention is particularly useful in allowing the pressure prevailing in a tire to be measured. Consequently, with a particularly simple installation, it is possible to obtain all the properties desired from an inflation circuit.

According to the invention, in order to overcome the problems of cost and complexity of the equipment, the non-return valve has a floating stopper forming a free differential valve.

The plug is preferably made of rubber. Upon deflation, provided that the pressures on either side of the stopper are close to one another, the stopper floats and the free valve is open. If the pressures are too different, the floating stopper is forced up against the top of a discharge bore and closes the valve.

The invention therefore relates to an inflation circuit comprising a compressed fluid source, a compressed fluid supply line connected to the source, a non-return valve interposed in the supply line between a reception chamber to be inflated and the fluid source, a branch connected to the supply line between the non-return valve and the source, a diversion line connected to the branch, and a calibrated leak device connected to the diversion line so as to form a calibrated leak of compressed fluid from the branch, characterized in that the non-return valve comprises a free differential valve.

The invention also allows another problem to be solved. Due to the presence of a rotary joint between a pipe network leading from the hub of a wheel intended to be equipped with a tire (the tire in this case being the chamber to be inflated) and from this hub to the compressor, difficulties arise in achieving the necessary sealing-tightness. To solve this problem, the invention proposes to mount the valve, with its non-return mechanism in the mobile assembly, in the wheel itself, and preferably in the hub of the wheel. Therewith, on the one hand all the leaks of the rotary joint have no effect on the sealing-tightness necessary for maintaining the inflated chamber at pressure. In fact, this rotary joint is located between the non-return valve and the compressed air source. On the other hand, the imbalances which might arise from the unbalancing presence of a valve are avoided, since the non-return valve is mounted in the central, mobile part of the hub of a wheel.

The invention therefore also relates to an inflation circuit of a tire mounted on a wheel comprising a non-return valve interposed therein and a hub intended to receive the wheel, the hub having an axis of rotation, characterized in that it comprises as a non-return valve a two-way valve mounted in the axis of the hub. Therefore, it relates to a wheel, in particular for a vehicle, characterized in that it is equipped with such an inflation circuit. In this case, the non-return valve is mobile with the wheel.

Finally, another problem is that of setting the two-way valve. In order to solve this problem, it is therefore proposed in the invention to mount a loss of head device between an outlet of the chamber to be inflated and the non-return valve. Preferably, this loss of head device is adjustable.

The invention therefore also relates to an inflation circuit comprising a compressed fluid source, a compressed fluid supply line connected to the source, a non-return valve interposed in the supply line between a reception chamber (to be inflated) and the fluid source, a branch connected to the supply line between the non-return valve and the source, a diversion line connected to the branch, and a calibrated leak device connected to the diversion line in order to effect a calibrated leak of compressed fluid from the branch, characterized in that the reception chamber is disposed in a wheel intended to be equipped with a tire, and in that it comprises a loss of head device (78) interposed between the compressed fluid reception chamber and the valve.

The invention will be explained more fully in the following description with reference to the accompanying drawings. These are given solely by way of example and are in no way limiting, and show:

DETAILED DESCRIPTION

Figure 1:
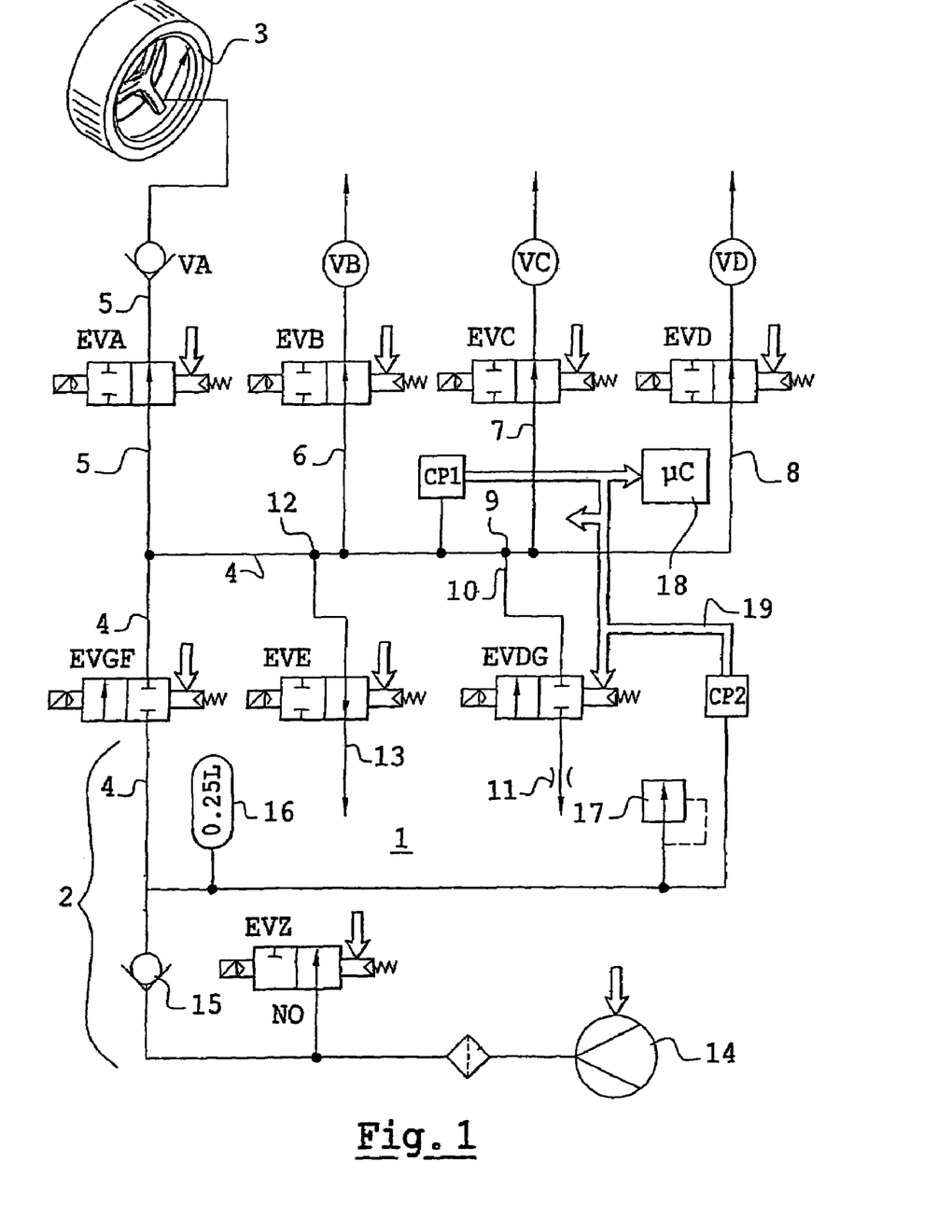
FIG. 1 a diagram of an inflation circuit according to the invention.

FIG. 1 shows an inflation circuit 1 according to the invention. This circuit 1 comprises a compressed fluid source 2, in practice compressed air. The circuit 1 makes it possible to supply a reception chamber or pressure chamber 3. The chamber 3 is for example that formed on the right side of a vehicle tire. The circuit 1 further comprises a compressed fluid supply line 4. This circuit 1 may be particularly simple according to the invention and comprise in particular a single duct leading from the source 2 to the reception chamber 3. Otherwise, the supply line 4 may have as many branches 5 to 8 as there are independent chambers, particularly if the vehicle has a plurality of tires. Between each reception chamber 3 and the source 2, in the supply line 4 or in the branches 5 to 8, a non-return valve is interposed. A non-return valve VA is interposed for example in the branch 5 between the chamber 3 and the source 2. The same applies to the non-return valves VB, VC, and VD for the branches 6, 7 and 8.

These non-return valves may be, according to the invention and as will appear below, the two-way type with piston and slide or the two-way type with a simple non-return valve, or more precisely may be springless and include a free differential valve.

According to an essential feature of the invention the supply line 4 comprises a branch 9 connected to the supply line 4, between the non-return valve VA and the source 2. In this case, connected between the non-return valve VA and the source 2 means that the branch 9 receives a fluid at the same pressure as a relevant non-return valve VA, when the valve is in the biased state. A diversion line 10 is connected to the branch 9. The diversion line 10 has a calibrated leak device 11 to effect a calibrated leak of compressed fluid from the branch. This calibrated leak may take the form of a simple pinching of a line.

The supply line 4 is however adorned with a certain number of slide valves allowing improvement and independent inflation of different tires. Thus solenoid valves EVA, EVB, EVC and EVD are connected in series in the branches 5 to 8. They make it possible to isolate from one another the non-return valves VA, VB, VC and VD of the supply line 4. The solenoid valves EVA, EVB, EVC and EVD are of the type which are normally open, i.e. they allow the fluid to pass in one direction or another when they do not receive a positive command. When they receive a positive command, they are closed.

On the supply line 4 is preferably further installed, between the compressed air source 2 and the non-return valves VA to VD an inflation solenoid valve EVGF of the type which is normally closed. The symbol retained in FIG. 1 shows in fact that the valve EVGF presents to the line 4 a closed slide and not an open slide. Furthermore, to a branch 12 connected to the supply line 4 is connected an escape line 13 via an escape solenoid valve EVE of the type normally open. In the diversion line 10, between the branch 9 and the calibrated leak device 11 a deflating solenoid valve EVDG of the type normally closed is installed, which permits, in a preferred case, operation or otherwise of the calibrated leak 11.

The compressed air source 2 itself is preferably realized from a compressor 14 connected by a filter F and a non-return valve 15 to the supply line 4 by passing through the valve EVGF. A solenoid valve EVZ for connecting to the free air, of the type normally open, is mounted on a free branch between the compressor 14 and the non-return valve 15. The compressed air source further has a reservoir 16, of 2.5 l in one example, connected freely to the line 4 upstream of the inflation valve EVGF. This part of the line 4 upstream of the slide valve EVGF further comprises a safety valve 17 as well as a pressure sensor CP2. Downstream of the inflation valve EVGF, a pressure sensor CP1 is freely mounted on the supply line 4. The sensor CP1 allows the pressure in the chamber 3 to be measured, and the sensor CP2 allows the pressure supplied by the compressor 14 to be measured. With a supplementary slide valve, it would be possible however to have only one sensor.

A control device, shown diagrammatically here in the form of a microcontroller 18, µC, is connected by a bus 19 of addresses, commands and data to each of the solenoid valves of the circuit thus shown, to the compressor 14 and to the pressure sensors CP1 and CP2. The commands are shown on each of these elements by an arrow indicating one end point of the bus 19. The microcontroller 18 is formed in practice of a microprocessor, a program memory and a memory of associated data. Most of the time such a circuit 18 takes the form of a single integrated electronic circuit. The program recorded in the program memory is normally recorded during manufacture. It is possible, however, to have programmable microcontrollers. By way of modification, the work of the microcontroller 18 is undertaken by a general microprocessor of the vehicle.

The operation of this assembly, according to a preferred embodiment of the invention, is as follows. Whereas the solenoid valve EVZ receives a positive command to be closed, the solenoid valve EVGF receives a negative (or zero) command to remain closed. Then the compressor 14 is set in motion. This setting in motion causes inflation of the reservoir 16. The presence of the safety valve 17 as well as the pressure sensor CP2 making it possible to limit the pressure of air contained in the reservoir 16 either automatically or in a manner controlled by the microcontroller 18. When this desired pressure is obtained, the compressor 14 is stopped and the slide valve EVZ receives a negative command. It then returns to its normal state, where it connects the duct upstream of the non-return valve 15 to the free air. Under these circumstances the pressure of the upstream side of the valve 15 decreases abruptly, and the valve 15 closes in a sealing-tight manner. The supply line 4, in the upstream part of the valve EVGF is then at the desired pressure.

In order to act on a chamber 3 independently of the others with the slide valves EVA to EVD, the branch 5 to 8 is selected which is to be supplied. For example, in order to supply the chamber 3, the valve EVA receives a negative command and remains open, whereas the other three slide valves are closed by receiving a positive command. In this case, only the branch 5 of the supply line 4 will be subsequently active. All the branches can be selected in turn with the slide valves EVA to EVD.

In order to inflate the tire one starts by closing the escape valve EVE, which switches upon receiving a positive command. In the case of inflation, furthermore, the calibrated leak 11 is preferably isolated, also causing the deflation valve EVDG to switch. Then the valve EVGF, normally closed, is opened by sending a positive command thereto. This positive command is maintained until the pressure sensor CP1 informs the microcontroller 18 that the expected pressure has been reached. At this moment, the microcontroller 18 closes the slide valve EVGF. Inflation is complete.

During the inflating phase, it is possible however that the sensor CP1 does not indicate the actual pressure in the tire, due to loss of head due in particular to choking. To overcome this problem, it is provided to maintain inflation for a duration necessary to reach a set-point value. According to the pressure level of the tire at the start of inflation, it is possible to determine experimentally a duration of inflation at the end of which this set-point value is supposed to be attained. The microcontroller 18 serves to memorize these experimental values and to apply as a necessary duration a duration of inflation corresponding to an experimental duration.

By way of modification, one can apply phases of inflation (or deflation) followed by phases of pressure measurement (as will be demonstrated below) alternately. These operations are repeated as necessary in order to reach the set-point pressure to be achieved.

It will be noted to this end that the valve EVDG, although particularly useful, is not entirely indispensable. In fact, if the output of the calibrated leak is small, and if on the other hand the reserve of compressed air in the reservoir 16 is great, this slide valve can be omitted and inflation of the tire can be brought about by tolerating a leak 11. In any case, at the end of inflation, the supply line 4 is at the expected pressure, as is the chamber 3 of the tire.

In order to close the non-return valve VA, in particular if there is no slide valve EVDG on the line 10, the slide valve EVE is caused to switch. Thus the part of the supply line 4 downstream of the inflation valve EVGF which has just been closed is rapidly connected to the free air. Thus the pressure in the supply line 4 drops abruptly and the non-return valve VA closes naturally.

The choice of slide valves which are normally closed or normally open, as has been disclosed hitherto, is particularly important because it means that when no action is to be taken on the tire chambers, it is possible to keep the whole circuit connected to the free air, without pressure, and without consuming electricity by way of the actuating circuits, because all the actuating elements are at rest.

In order to bring about deflation of the tire, whereas this tire has been selected by the slide valve EVA, the slide valve EVE for connection to the free air is closed first of all. Then, for a brief period, e.g. one second, the inflation slide valve EVGF is opened, then re-closed. Thus a slight high pressure is created in the supply line 4. This high pressure opens the valve VA. Then, the deflation valve EVDG is opened by being subjected to a positive command. Due to the high pressure, the non-return valve VA has been opened, allowing communication between the supply line 4 and the chamber of the tire. Due to the calibrated leak 11, the pressure in the supply line 4 decreases. It decreases slowly, however, continuing to allow the valve VA to stay open and a leak of air contained in the chamber 3 of the tire.

This leak is produced normally provided that the pressure of the tire is only slightly higher than the pressure in the supply line 4. In principle, these two pressures should balance. But as the pressure in the supply line 4 decreases progressively, the pressure in the chamber of the tire also decreases progressively right down to complete deflation if desired. Due to differences in manufacturing technology, it will be seen that such total deflation is obtained when the valve is of the two-way type with a simple non-return valve. For piston and slide valves, the presence of a spring for closing the valve means that deflation is not total, but only down to a pressure of about 1 bar. Such deflation is sufficient however to permit adaptation to any possible driving conditions.

It has been possible to measure that the durations of total deflation by acting thus were from 100 to 200 seconds. If more rapid deflation is required, it is not possible as it carries the risk of closure of the non-return valve VA and halting of deflation. The size of the calibrated leak 11 is therefore adapted so that deflation is of this duration and not too short. In the field of industry, duration of this length is selected, in particular in order that it is longer than 50 seconds. In this case, there is no operating fault, and the process of deflation is successful each time. Obviously, such a duration is not at all detrimental to a vehicle which has been moving for many hours at a time.

Obviously, if it is sought to deflate the tire just a little, in order that its pressure ends up at an expected pressure, by means of the pressure sensor CP1 and the microcontroller 18, the escape valve EVE can be switched when the moment comes, so as to reduce the pressure in the supply line 4 abruptly. This abrupt decrease immediately causes sticking of the non-return valve VA and halting of deflation. Preferably, one proceeds according to the two modifications disclosed above.

With the circuit such as shown, it is possible furthermore easily to realize pressure control in any one of the tires. For such a pressure measurement for the purpose of control, first of all one of the valves EVA to EVD is selected which corresponds to the tire to be checked. Then the escape valve EVE is closed and the deflation valve EVDG is closed. Then, for a short time, e.g. one second, the inflation valve EVGF is caused to open. Thus the high pressure in the supply line 4 opens the non-return valve VA of the chamber of the selected tire and keeps this valve VA open, thus creating a pressure in the supply line 4, in particular at the moment of re-closure of the inflation valve EVGF which is exactly equal to the pressure prevailing in the chamber 3 of the tire. It is possible with this pressure measurement to display on a dashboard of a vehicle an indication informing the driver of the pressure of his tires. Otherwise, according to a program recorded in a program memory of the microcontroller 18, it is possible to command automatic adjustment of the pressure of the tires to an expected value. For example, a pressure measurement of each of the tires every six minutes can be arranged. The results of these measurements can furthermore be stored in a memory of the microcontroller 18. An action of inflation or deflation of each of these tires can then be carried out if the difference between a measured pressure and an expected pressure is greater than a given threshold.

As has been found, the various valves presented, although preferably present in the inflation circuit according to the invention, are not entirely indispensable. The valves EVA to EVD are only justified insofar as there are plural reception chambers to inflate or deflate selectively. The inflation valve EVGF is only useful if it is not possible/known to actuate the compressed fluid source 2. The escape valve EVE is only used for inflation if one does not know how otherwise to reduce the pressure of the compressed air source 2 abruptly. Finally, the deflation valve EVDG is not necessary during deflation if the output from the fluid source 2 is sufficient to permit inflation. In the same way, the reservoir 16 can be omitted, and the compressor 14 might, without the slide valve EVGF, bring about all desired states of pressure and output. In this case, the slide valve EVZ could also be omitted. On the other hand, the pressure sensors CP1 and CP2 can be replaced by output sensors insofar as one is able furthermore to use an output datum to deduce a state of pressure in the reception chambers to be controlled. By way of modification, the pressure sensor CP1 is placed in the chamber 3. It transmits its measurement by induction, by means of an integral inductive transmitter or by means of a radioelectric transmitter. In this case, there would be as many sensors as chambers and wheels equipped with inflated tires to be controlled.

Figure 2:
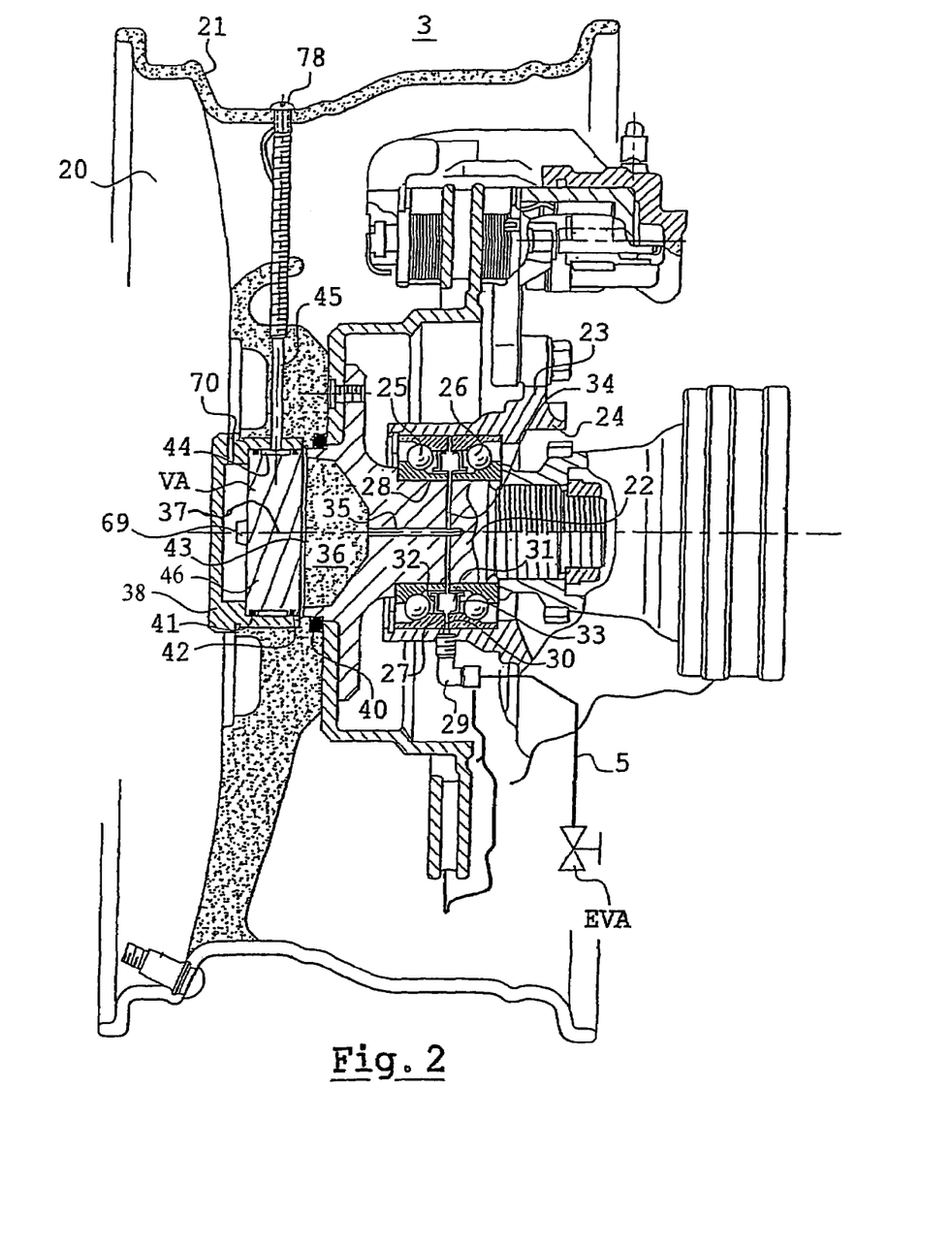
FIG. 2 a preferred embodiment of assembly of a non-return valve according to the invention in a wheel of a vehicle.
Figure 3A:
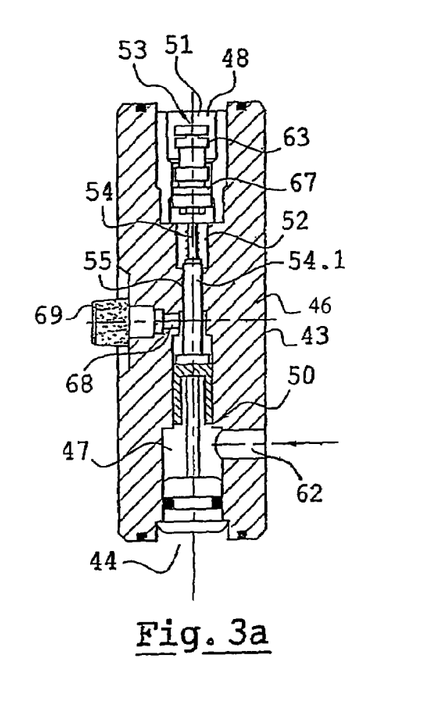
FIGS. 3a, 3b and 4a, 4b, section diagrams of a two-way piston and slide valve forming a non-return valve according to the invention in the closed state and in the open state respectively.
Figure 3B:
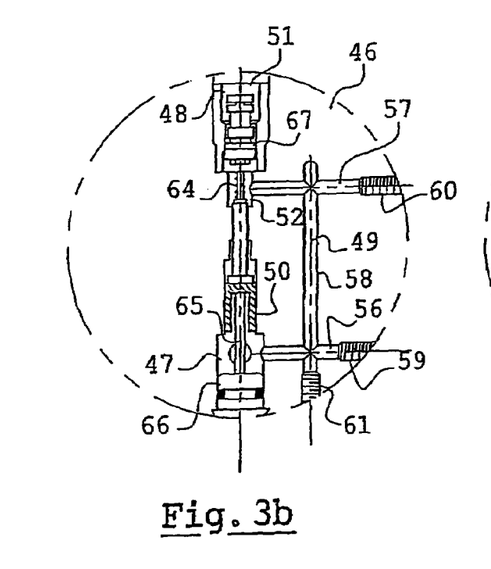
Figure 4A:
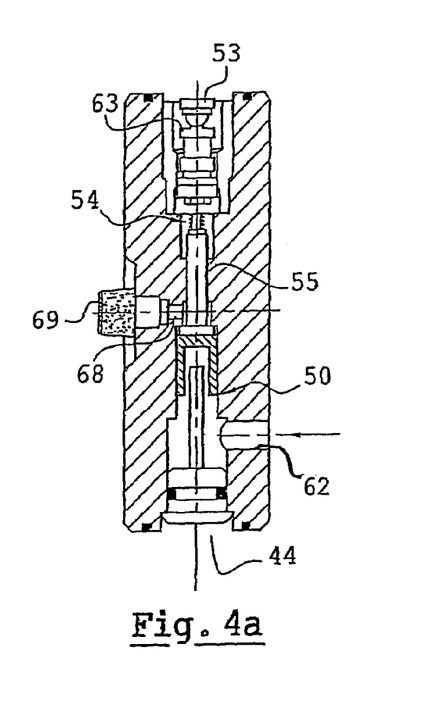
Figure 4B:
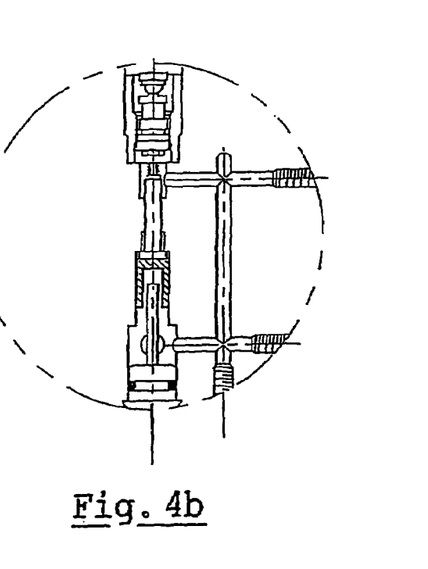

FIGS. 3*a* to 4*b* show particular embodiments of two-way piston and slide valves, as non-return valves VA to VD, respectively in a closed position (FIGS. 3*a* and 3*b*) and in an open position (FIGS. 4*a* and 4*b*). These valves are intended to be mounted in a wheel 20 such as shown in FIG. 2. This wheel 20 has a rim 21 connected mechanically to a shaft 22 rotating in a bearing 23 of a hub 24. The rotation is permitted by two ball bearings 25 and 26 which are parallel and coaxial. An outer crown 27 of the roller bearings is kept fixed on the bearing 23. A mobile inner crown 28 of these roller bearings is rigidly connected to the shaft 22. The branch 5 of the supply line 4, downstream of the valve EVA ends on a hollow connecting ferrule 29. The ferrule 29 is fixed to the fixed crown 27 common to both roller bearings 25 and 26. This ferrule opens, with a short line 30 penetrating into the crown 27, into an annular chamber 31 housed by two joints with parallel lips 32 and 33 in the annular space of the double roller bearing, between the two races 25 and 26 of the balls of these bearings.

The annular chamber 31 is further connected, e.g. via a line 34 diametric to the shaft 22, to a segment of a longitudinal axial line. The segment 35 opens into an end chamber 36. The chamber 36 is preferably circular, concentric to the axis 37 of the wheel 20 and the shaft 22, and has a sufficiently large diameter to allow the insertion of a non-return valve VA, which is in this case preferably circular, in any angular position inside a circular housing 38. The housing 38 is formed, in the axis 37 of the rim 21, in a closing capsule 39. The housing 38 is circular and preferably centered on the axis of the hub. The fact of being in the axis then allows the non-return valve to operate in the same way for any position of the wheel. Furthermore, the non-return valve is then not subjected to centrifugal forces. In one example, the housing has a diameter of 70 mm.

In order to ensure the sealing-tightness of the assembly, the shaft 22 is held rigidly on the rim 21 via a toric sealing-tight joint 40. In order to avoid leaks between the chamber 36, the non-return valve VA and the exterior, the non-return valve VA is mounted in the housing 38 with two toric joints 41 and 42. As will be seen below, the non-return valve VA has a non-return-type communication between a face 43 opposite to the chamber 36 and a circular groove 44 formed between the two toric joints 41 and 42. The groove 44 opens furthermore (in the housing 38) opposite to a line 45 mounted in a sealing-tight manner between the inner part of the chamber 38 and the outer part, but inside the tire, on the rim 21.

By acting thus, and placing the non-return valve VA in the housing 38, access can be gained to a chamber of any tire. It will be noted that, since the joints are rotary, in particular those mounted in the double roller bearing 25-26, it is preferable, as is indicated by the invention, to have slide valves which, in the non-excited state, make it possible to maintain the pressure in the tires without allowing untimely deflation.

FIGS. 3*a* to 4*b* show a two-way piston and slide valve, a non-return valve such as VA to be mounted in a circular housing 38. FIGS. 3*a* and 4*a* are sections along the section plane of FIG. 2, or along a plane passing through the axis 37, whereas FIGS. 3*b* and 4*b* are sections along a plane perpendicular to the axis. The housing 38 of the non-return valve VA contains a circular cylindrical plate 46 with two chambers 47 and 48 aligned in a diameter of the plate. The two chambers are pneumatically interconnected by a communication line 49. The first chamber 47 receives an operating piston 50. The other chamber 48 comprises a flap valve 53 between a downstream part 51 and an upstream part 52. The flap valve 53 is actuated by a rod 54 driven by the operating piston 50 via a slide 54.1. To this end, the slide 54.1 passes from one chamber 47 to the other 48 by a line 55. On the right side of the line, the slide 54.1 has a diameter which is very close to the bore of the line 55.

The communication line 49 comprises three inclined, mutually intersecting bores. In practice, they are preferably perpendicular to one another. Two bores 56 and 57 open respectively into the first chamber 47 and into the second chamber 48. The third bore 58 is parallel to the diameter with which the two chambers are aligned. Being intersecting, the three bores together form the line 49. These three bores are formed by perforations effected from the periphery of the plate 46. In order to isolate the line 49 from the exterior, and in particular the groove 44, the three bores are blocked by sealing-tight stoppers 59 to 61 at their end located at the periphery of the plate. On a face 43 intended to come opposite to the chamber 36, the plate 46 comprises a hole 62 connecting this chamber 36 to the interior of the chamber 47. Since, however, the chamber 47 communicates with the chamber 48 via the communication line 49, clearly the chamber 47 and the chamber 48 communicate with the chamber 36, and therefore ultimately with the branch 5.

For FIGS. 3*b* and 4*b*, high pressure is applied in the chamber 36. This high pressure inflates the chamber 47, and thus pushes back the piston 50 and the slide 54.1 in the direction of the flap valve 53. The flap valve 53 is normally pushed back against its seat 63 by a spring 64 bearing on the rear part 52 of the chamber 48 and against an edge of the slide 54.1. Thus the flap valve 53 disengages from its seat 63, permits the parts 51 and 52 of the chamber 48 to communicate via an inner line and allows the high pressure to inflate the chamber 3 of the tire. In order to prevent the piston 50 from being pushed back too far by the force of the spring 64, the piston abuts a stop 65 inserted through the back of the chamber 47. The chamber 47 is further blocked by a sealing-tight stopper 66, which holds the stop 65. In the other chamber 48, a unit 67 comprising the flap valve 53 and its seat 63 is inserted into the chamber 47 in order to house the two parts 51 and 52 therein.

The flap valve 53 is held open at the moment of deflation as a result of the chamber's 47 preferably having on the right side of the piston 50 a larger diameter and especially a larger useful surface area than the section for the passage of air into the inner line in the flap valve 53. In this case, even if the pressure in the chamber 47 is lower than the pressure in the part 51 of the chamber 48, the flap valve does not re-close. The valve can be kept open thus provided that the difference of pressures referred to the surfaces where the said pressures are exerted is greater than the force of the spring 64.

The bores of the line 55 and of the chamber 47 are closely adapted to the respective diameters of the slide 54.1 and of the piston 50 on their right side. Such adaptation arises from the improved compromise permitting the sliding of the slide and piston, without allowing a leak between the two chambers 47 and 48. In order therefore to facilitate the correct functioning of the two-way piston and slide valve in FIGS. 3a to 4b, the forward movement of the piston 50 is freed up in order that it can penetrate further forward into the chamber 47. Since the piston can be brought to compress the air between its base and the inlet of the line 55, it is provided therefore to evacuate the air present in this location via a leak 68 (FIGS. 3a and 3b). This leak 68, which establishes a communication between the base of the piston 50 and the exterior of the valve is furthermore surmounted by a filter 69. In fact, at the moment when the piston recoils, when the flap valve 53 closes, the air is sucked up by the leak 68. With the filter 69, the polluted air is prevented from blocking the mechanism of the valve.

It will be noted furthermore in the housing 38, in the part thereof containing the filter 69, that there is a perforation 70 for the insertion of the plate 46 into this housing 38. In fact, without this connection to the air 70, the insertion of the plate can be hindered by the presence of the two toric joints 41 and 42. A free connection to the air of this space thus permits the confined air to rejoin the atmosphere. The reason for the filter 69 is mainly to be found in this connection to the air 70.

Figure 5:
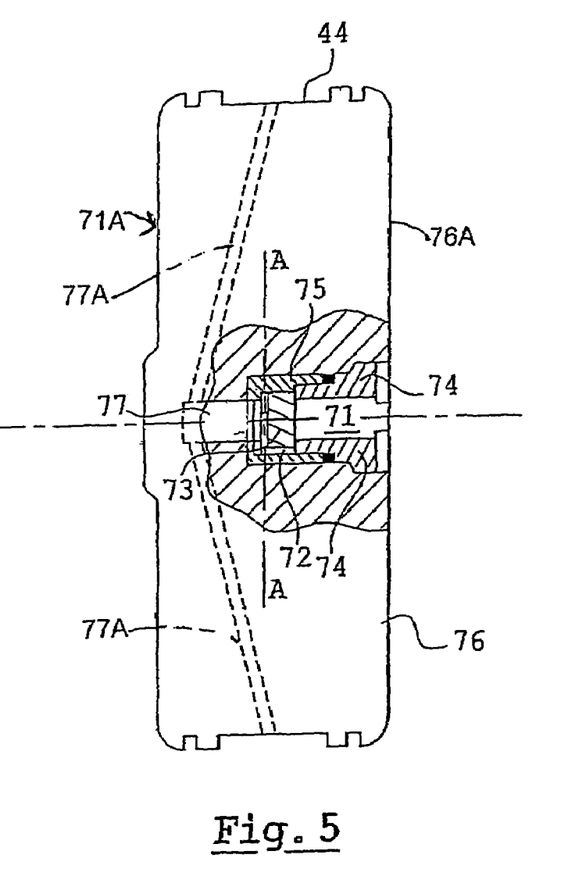
FIG. 5 a section diagram of a preferred two-way valve with a simple non-return mechanism, viewed along the section line AA in FIG. 6.

FIG. 5 shows that the valves VA-VD may comprise a two-way simple springless non-return valve 71A which includes a free differential valve 71. This valve 71 comprises a ferrule 74 which keeps a circular cylindrical floating stopper 73, of the free differential valve. The valve 71 is said to be free because the stopper is floating. It is differential because the stopper is subject to displacements depending on the differential pressures which it receives on each of its circular faces. The valve 71 comprises to this end a first hollow ferrule 74, of which an inner bore 72 is smaller than the diameter of the stopper 73. It further comprises a cap 75, which is perforated and surmounts the ferrule. The cap 75 has an inner bore whose diameter is larger than that of the stopper 73. The cap 75 is mounted on the ferrule 74 by means of a joint, which serves both to provide sealing-tightness between the cap 75 and the ferrule 74 and between these parts and a plate (see above for explanation relating to the plate 76). The stopper 73 is placed between the cap and the top of the ferrule, in the space where the bore of the cap is larger than the diameter of the stopper. At this place, the stopper can rest on top of the ferrule. In this rest position, the stopper obstructs the passage of air into the ferrule and forms a non-return valve. The valve 71A forms a non-return valve which is here called simple because it does not have a spring, slide or piston. The diametric floating clearance of the stopper 73 in the bore of the cap 75 acting as a valve is such that, whatever the position of the stopper 73, the bore 72 is always blocked by simple placing of the stopper 73 at the top of the ferrule 74.

The free distribution valve 71 is further mounted in a plate 76 of the non-return valve 71A, which is of the same type as the plate 46. It is intended to be mounted in the housing 38 of a hub. Compared to the two-way piston and slide valve of FIGS. 3a to 4b, the valve 71A makes it possible to overcome numerous problems. Due to its simplicity, having neither a piston nor spring, it is much cheaper. Not having a slide, it does not require a leak 68 nor a filter 69. The valve 71 is only mounted in the plate 76 opposite to a perforation 77 starting from a circular face 76A of the plate 76. The perforation 77 does not open into the other face of the plate 76. It intersects with a diametric perforation 77A which opens into the groove 44. Preferably, the diametric perforation opens from the two sides of the diameter. Even the work on the plate 76 is thus reduced, as there is no stopper to mount.

In the invention, it has been found furthermore that this valve 71 admits the same type of deflation operation as that described for the piston and slide valve, for which such deflation is only explained by the presence of a piston having a bearing face which is larger on the side of a weaker pressure (on the side connected to the air) than on the side of a higher pressure (on the side of the tire chamber). In this case, it is has been possible to observe that such a phenomenon of deflation can be produced because, upstream of the valve 71A, on the side of the tire chamber, the flow of air undergoes greater losses of head than on the side of the calibrated leak 11. In order therefore to increase this beneficial effect (from this point of view) of loss of head, it is provided to surmount the conduit 45 in the place where it penetrates into the chamber 3 of a choke. This choke acts essentially as a loss of head device. This choke is for example obtained by mounting a perforated screw 78 at the end of the line 45. The screw 78 allows a little air to pass, but not too much, so that the pressure gradient from one end (screw 78) to the other (leak 11) of the escapement is sufficiently weak that the stopper can continue to float in the space allotted to it between the ferrule 74 and the cap 75. With the valve 71, it is possible to obtain total deflation, since no spring comes at any moment to obstruct the difference in pressure resulting from the pressure gradient during deflation.

Furthermore, the rims 21 may be additionally equipped with a conventional valve (FIG. 2). Compared to such conventional valves, the valves shown above make it possible however not to generate imbalances in the mounted wheel. Furthermore, due to their central position in the hub of the wheels, the different parts of the valves are only slightly subjected to stray forces, because they are hardly, if at all, subjected to centrifugal force (in particular in a more advantageous configuration of the valve, such that the movements of opening and closing of the valve are made parallel to the axis of rotation), which forces put out the precise balances of forces applied to the different parts during inflation, deflation and adjustments of pressure. As far as the simple non-return valve is concerned, preferably the bore 77 is formed in the axis of the cylindrical plate 76, and since the stopper 73 is in a central position, it is not even subjected to any centrifugal force. Its adjustment is more precisely achieved.

Figure 6:
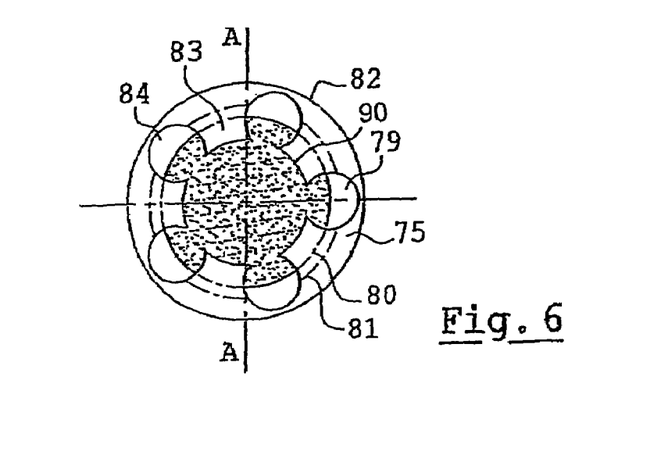
FIG. 6 a detail of a view according to F in FIG. 5 of a preferred embodiment of a free two-way valve.

In FIG. 6, a preferred form of the cap 75 is shown. In fact, if in the embodiment in FIG. 5, the part of the stopper 73 opposite to the perforation 77 is pushed flat against the edge of the perforation 77, inflation of the chamber is made difficult. It may then be necessary to inflate the same with slightly high pressure. In order to inflate the chamber with very high pressure, the top of the cap 75 opposite to the ferrule 71 has been modified. This cap 75 comprises, according to an improvement, a first top perforation 90 opposite to the bore 77 in order to ensure communication of inflation. This perforation 90 is equipped with cavities 79 placed at its periphery. The cavities 79 are preferably round. Preferably they do not cross from one side to the other of the top of the cap 75. They are preferably formed only in the inner part thereof. They are nevertheless higher than the inner top of the stopper 75. They span the contour of the perforation 90 with their profile. The diameter of the perforation 90 is less than the diameter 80 of the stopper 73. The diameter 80 of the stopper 73 is itself lower than the diameter 81 of the interior of the cap 75 in its part which receives the stopper 73. Consequently, the stopper 73 may float therein. The floating clearance furthermore takes into account expansion due to compressions of the stopper 73 when the valve is closed. The eccentric parts of the cavities 79 go beyond the contour 81. However, these eccentric parts remain within the outer contour 82 of the cap 75 in order to ensure sealing-tightness thereof. The cap thus has an internal shape of a trefoil, in one example with five leaves.

The function of this cap is as follows. During deflation, the stopper 73 is pushed back by pressure of air from its rest on the top of the ferrule 71. By floating in the cavity of the cap 75, it comes to bear with its upper edge on the tables 83 present between the cavities 79, between the leaves of the trefoil. The cavities 79 are higher than the bore 81 of the cap 75. By resting against these tables 83, the stopper 73 creates spaces 84 for the circulation of inflating air. These spaces 84 are located in the parts of the cavities 79 which are not occupied by the stopper 73. On the side of the ferrule 71, the spaces 84 are obviously in communication with this ferrule 71, since the stopper 73 is removed from its rest position against this ferrule 71 and since the cavities 79 extend preferably from the part of this cap 75 which bears against the ferrule 71. On the side opposite to the ferrule 71, the spaces 84 communicate with the bore 77 or the perforation 90, because the cavities 79 are higher than the bore 81 of the cap 75. And since they intersect by their profile with the profile of this bore 81, the communication of air is easily established. It should be noted finally that the stopper 73 also makes possible dismantling of the wheel except for the hub (the plate 76 remains integral with the wheel) without deflating the tire.

The invention claimed is:

1. An inflation circuit comprising a compressed fluid source, a compressed fluid supply line connected to the source, a non-return valve interposed in the supply line between a reception chamber and the fluid source, a branch connected to the supply line between the non-return valve and the source, a calibrated leak device communicable with the supply line in order to form a calibrated leak of compressed fluid from the supply line, wherein the reception chamber is defined by a wheel intended to be equipped with a tire, and further comprising an adjustable choke disposed in the wheel between the non-return valve and the compressed fluid reception chamber of the wheel.

2. The circuit according to claim 1, wherein the non-return valve is springless and includes a differential valve.

3. The circuit according to claim 2, wherein the differential valve is mounted in a hub of the wheel along a rotary axis of the wheel.

4. The circuit according to claim 2, wherein the differential valve comprises a hollow ferrule surmounted by a cap and a stopper floating in an inner space of the cap at the top of the ferrule.

5. The circuit according to claim 1, wherein the non-return valve comprises a circular cylindrical plate with a first diametric perforation communicating with a second perforation intersecting a circular face of the plate, a differential valve being mounted opposite to the second perforation.

6. The circuit according to claim 1, wherein the non-return valve comprises a circular cylindrical plate equipped with a circular groove formed in its peripheral face and two toric joints bordering this groove.

7. The circuit according to claim 1, further comprising an actuated slide valve (EVGF) for isolating the fluid source from the calibrated leak.

8. The circuit according to claim 1, further comprising a slide valve (EVDG) interposed between the calibrated leak and the supply line.

9. The circuit according to claim 1, further comprising a pressure or output measuring device (CP1) connected to the supply line.

10. The circuit according to claim 1, further comprising an adjustment circuit for controlling the calibrated leak device from a signal issued by a pressure or output measuring device.

11. The circuit according to claim 1, further comprising on the supply line a plurality of branches mounted between respective non-return valves (VA, VB, VC, VD) of plural reception chambers and the fluid source, and a set (EVA, EVB, EVC, EVD) of slide valves mounted on respective distribution lines connected to the branches.

12. The circuit according to claim 11, wherein the non-return valves can be controlled independently of one another.

13. The circuit according to claim 1, wherein the leak is calibrated to permit total deflation of the chamber in more than 50 seconds.

14. The circuit according to claim 2, wherein the differential valve includes a floating stopper.

* * * * *